(12) United States Patent
Zilberberg et al.

(10) Patent No.: US 6,505,036 B2
(45) Date of Patent: Jan. 7, 2003

(54) APPARATUS AND METHOD FOR REDUCING EFFECT OF MOBILE TELEPHONE RADIATION

(76) Inventors: David Zilberberg, 11 A Petai Street, Tel Aviv 69973 (IL); Jacob Gavan, 3 Zimanhof Street, Netanya 42309 (IL)

( * ) Notice: Subject to any disclaimer, the term of this patent is extended or adjusted under 35 U.S.C. 154(b) by 91 days.

(21) Appl. No.: 09/776,169

(22) Filed: Feb. 2, 2001

(65) Prior Publication Data

US 2001/0027115 A1 Oct. 4, 2001

Related U.S. Application Data

(63) Continuation of application No. PCT/IL99/00427, filed on Aug. 3, 1999.

(30) Foreign Application Priority Data

Aug. 5, 1998 (IL) .................................................. 125674

(51) Int. Cl.[7] .......................... H01Q 11/12; H01Q 1/24; H04B 1/04; H04B 1/38; H04M 1/00
(52) U.S. Cl. ........................ 455/117; 455/90; 455/550; 455/575; 343/702
(58) Field of Search .................................. 455/562, 550, 455/575, 129, 269, 117, 90, 347; 379/431; 343/702, 805; D14/138

(56) References Cited

U.S. PATENT DOCUMENTS

| 5,486,836 | A | | 1/1996 | Kuffner et al. |
| 5,513,383 | A | | 4/1996 | Tsao |
| 5,541,609 | A | * | 7/1996 | Stutzman et al. ............ 343/702 |
| 5,630,211 | A | * | 5/1997 | Nagai ........................... 455/90 |
| D389,477 | S | * | 1/1998 | Tabankin et al. ........... D14/138 |
| 5,945,954 | A | | 8/1999 | Johnson |
| 5,990,839 | A | * | 11/1999 | Schefte et al. ............... 343/702 |
| 2002/0077160 | A1 | * | 6/2002 | Edwards et al. ............. 455/575 |

FOREIGN PATENT DOCUMENTS

| DE | 295 08 792 | 11/1996 |
| EP | 0 661 825 | 7/1995 |
| EP | 0 871 236 | 10/1998 |
| WO | WO 97/26713 | 7/1997 |
| WO | WO 98/45893 | 10/1998 |
| WO | WO 98/36988 | 7/1999 |

* cited by examiner

*Primary Examiner*—Nay Maung
*Assistant Examiner*—Raymond Persino
(74) *Attorney, Agent, or Firm*—Barry R. Lipsitz

(57) ABSTRACT

A compact mobile telephone apparatus comprising a two part fold-over mobile phone wherein one part, the lower part, is a hand set containing a keyboard, microphone, and earphone, and the other upper part, is a cover for said handset pivotally connected thereto, characterized in that said cover contains a monopole antenna extendable through the cover, at the opposite end of the pivotal connection to the handset, to a distance of 8–16 cm. from the earphone when the cover is in the unfolded position, raising the locus of radiation laterally and vertically above the head, thereby significantly reducing radiation to the head and increasing antenna efficiency.

28 Claims, 3 Drawing Sheets

APPARATUS AND METHOD FOR REDUCING EFFECT OF MOBILE TELEPHONE RADIATION

FIELD OF THE INVENTION

The invention relates to a method and apparatus for mobile telephony radiation effect reduction, in particular to methods of reducing the radiation power radiated into a user's head, hand and. body and also, though not exclusively, to enhancing the wireless system efficiency and quality.

BACKGROUND OF THE INVENTION

The present invention concerns wireless handsets, where the number of users is increasing at a very large rate. Such wireless handsets include cellular phones, wireless phones, personal communication and walkie-talkie systems and equipment. Most of these portable devices are held very close to the user's head (and ear) during operation, as typically illustrated in FIGS. 1 and 2.

The normal distance between the input of the handset antenna, typically, from where most of the radiated energy is developed; typical distances from the handset antenna to the user's head may be only from 1.5 to 3 cm. At these small distances, strong coupling occurs between the handset case, antenna, user's head and hand which may result in up to 60% of the radiated. energy being absorbed within a small volume of the user's head, as described in "Electromagnetic Compatibility Handbook", Chapters 1, & 24 and Appendix H, Editor R. Perez, and published by Academic Press, 1995, and in "EM Interaction of Handset Antennas", by M. A. Jensen and Y. Rahmat Samii, Proceedings of the IEEE, January 1995, pp. 5–17. The contents of these documents are hereby incorporated by reference.

This undesired RF radiation absorption may influence, enhance or even cause the development of natural or spontaneous head tumors or cancer, as described in "Potential Public Health Risks from Wireless Technology", Scientific Advisory Group on Cellular Telephone Research, Washington DC, August 1994, Editor G. L. Carlo, (Fax number 202-833-2801). The contents of this document is hereby incorporated by reference. Furthermore, this absorption of radiation by the user's body, reduces the efficiency of desired radiation towards the base station which may require increasing the handset transmission power to achieve a high quality communication link, as described by Perez and in "Personal Communication Services, Technology and Health Concerns Modern Radio Science, 1996, pp. 263–277, by M. A. Stuchly, hereby incorporated by reference.

The significant scientific literature relating to the health hazards resulting from portable cellular or wireless phone, while providing useful information, is inadequate for drawing definitive conclusion about possible health risks. Therefore it is suggested to take precautions and reduce as much as possible, the radiation and the Specific Absorption Rate (SAR) reaching the human body, especially in the head region, as discussed in "Mobile Communication Safety", Chapman-Hall, 1997, Editors N. Kuster, Q. Balzano and W. C. Lin,: "Wireless Technology Research (WTR) Public Health Research", Activities June 1993–96, (June 1996), pp. 18, Editor G. L. Carlo; "Electromagnetic Fields 300 Hz to 300 GHz", Environmental Health Criteria 137, The WHO, World Health Organization, Geneva 1993, hereby incorporated by reference.

The effects of Portable Cellular Phone Radiation on the Users is quantifiable in terms of the SAR, mentioned above. The SAR is a very convenient unit to measure, simulate and evaluate the radiation health threat to a biological systems and represents the rate of radio frequency (RF) coupling to the biologic object of interest. The SAR indicates the rate at which energy is absorbed by an incremental mass of an exposed object, such as human tissue, divided by the incremental mass. The units of SAR are expressed in Watt/Kg. As defined by Kuster et al. and the WHO, the SAR can be computed using the following relations:

$$SAR = \frac{\sigma}{2\rho} * [E(t)] \wedge 2 \quad (1)$$

$$P_{ab} = \frac{1}{2} \int \sigma * [E(t)] \wedge 2 * dV \quad (2)$$

$$SAR = \frac{C * \Delta T}{t} \quad (3)$$

$$P_{rad} = \frac{1}{2} Re \int (\bar{E} x \bar{H}) * \bar{n} * dA \quad (4)$$

$$\eta_a = \frac{P_{t\,ad}}{P_{rad} P_{ab}} \quad (5)$$

where $\sigma$ and $\rho$ are the conductivity in mho/m and the specific density in Kg/mA^3, E(t) represents the total electric field in a voxel of tissue in (V/m), $P_{ab}$ is the power absorbed in the head and hand model in (Watt) and V represent the volume concerned.

C, $\Delta T$, & t represent respectively the specific heat of the tissue in J/(kg, °C.), the difference of temperature and the time exposure due to the radiation absorption, respectively.

$P_{rad}$ is the radiated power in Watt at far field distances, and A is the area element in m^2, $\eta_a$ is the radiated efficiency of the desired signal.

The European and IRPA radiation safety standard have some difference from the ANSI-IEEE new standards, "American National Standard Safety Levels with Respect to Human Exposure to RF EMF 300 KHz to 100 GHz", ANSI C95.1, The IEEE Inc., New York 1992, and also found in the WHO manual, Kuster, and Carlo, 1996. These disclosures of these documents are hereby incorporated by reference.

In the cellular 900 MHz band, the threshold SAR averaged over the whole body should not exceed 0.4 Watt/Kg for exposed workers for an averaging time of 6 minute and 0.08 Watt/Kg for the general population. In case of hands, wrist, feet and ankles radiation absorption, the threshold SAR should nor exceed 4 Watt/Kg for any 10 grams tissue and for more vulnerable tissues, such as in the human head, the radiation should not exceed 2 Watt/Kg or 1.6 Watt/Kg peak SAR, averaged over 1 gram of tissue in reference to the last ANSI/IEEE standard and also in Carlo, 1996.

The standard authorities also provide tables of threshold limits for the unperturbed root mean square electric field strength E (V/m), magnetic field strength H(A/m) and equivalent plane wave power density S in mWatt/cm^2. These threshold values are function of the radiation frequency range due to the resonant frequency of an average human body. For the cellular frequency range of 900 MHZ, concerning general population exposure limit to RF fields the threshold S, is f(MHz)/2000 on 0.45 mWatt/cm^2 related to IRPA and 0.30 mWatt/cm^2 related to IEEE/ANSI standards; double values for the PCS, and the future cellular band of 1800 MHz. In the 55 MHz range, used for the indoor home wireless phone, the general population threshold limits is 0.2 mWatt/cm^2, related to IRPA and 10/f(MHz) or 0.18 mWatt/cm^2 related to ANSI/IEEE standard, as in the WHO standards and "CENELEC Readies Provisional Rad- Hazard Requirement", Newswatch EMC, Compliance Eng. European Ed., April 1995, pp. 60–64, hereby incorporated by reference.

The present cellular handset transmitter power ranges extend from 0.2 to 6 Watt. The power range generates non-ionizing radiation, with a minor increase in the body or head temperature. However recent models, as described by Carlo 1994, Newswatch and "Numerical and Experimental Procedure for SAR Distributions Due to Mobile Telephones: an Overview", EMC Int. Symp. Proceedings Tutorial Roma 9.96, by G. Lazzi, Om P. Gandhi, pp. 79–86, hereby incorporated by reference, postulate that even Electromagnetic Fields (EMF) may change the biologic cellular growth control mechanism and for the human head may change the blood brain permeability. Groups of Swedish and Australia scientists recently reported, that amplitude modulated (AM), RF energy could affect the blood brain barriers of exposed users by a mechanism different than simple heating. Calcium effects and the increase of the head cellular division rate from low power level RF radiation, which may not produce cancer, but may influence or enhance the development of natural and spontaneous carcinogram tumors, which may develop into cancer.

Thus the newer generation of digital portable phone, using TDMA or CDMA multiplexing techniques, include low frequency Amplitude modulation (AM) signals (bursts), which may therefore be a threat to health, are superior to the older AMPS or NAMPS, which use analog frequency modulation methods, Carlo, 1994.

Furthermore, it is possible that in the future, the SAR threshold limit standard will become more severe especially for the human head affected by novel cellular portable phones using digital modulation techniques, Kuster 1997.

Thus, in conclusion it is useful and important to reduce, by as much as possible, the SAR to the human body, especially to the user's head, without affecting significantly the link quality of cellular phone.

The classical wire antennas for most cellular and wireless phone handsets are as follows: Short (whip) monopole $\lambda/4$ $3\lambda/8$ $\lambda/2$. These antennas may also operate as a vertical dipole and the helix antenna, as described by Lazzi et, al, and in "Radiowave Propagation and Antennas for Personal Communication", by K. Siwiak, Artech-House, 1995, hereby incorporated by reference.

The shortest and the most compact are the helix and the $\lambda/4$ monopole, of Jensen & R. Sammii 1995, the desired radiation diagram is similar to omnidirectional in the azimuth plane as required. However, when the handset antenna is close to the user's ear most of the energy, up to 60%, is absorbed in the head, characterized by the excessive SAR as shown in FIGS. 1 and 2.

The worst absorption and lowest desired radiation efficiency occur for the helix antenna. Less absorption and higher desired radiation efficiency are obtained using the monopole $3\lambda/8$ and dipole $\lambda/2$ antennas. However, these antennas are significantly longer and more complex, and the SAR and RF power absorption are still significant, as shown by Jensen & R. Sammii 1995. and Lazzi and P. Gandhi 1996.

In a few cases, sleeve dipoles are used, which avoid RF currents on the metallic part of the handset and improve slightly the desired radiation efficiency, Siwiak 1995.

More recently, printed circuit antennas were invented for cellular and PCS handsets. A lot of scientific and technologic efforts are devoted for the development of cellular handset printed antennas, such as Siwiak 1995, "Analytical and Numerical Analysis of Antennas for Hand-Held Mobile Telephones, by I. Shtrikman, PH. D. Thesis, Kassel September 1997, pp. 123, and "Folded Loop Antenna for Mobile Hand-Held Units, by K. D. Katsibas, C. A. Balanis, P. A. Tirkas, and C. R. Birtcher, IEEE on AP, Vol. 46, No. 2, February 1998, pp. 260–266 , hereby incorporated by reference.

A September 97 Doctoral Thesis by I Strikman, hereby incorporated by reference, presented a dual meandering antenna (DMA) originating from the dual L antenna (DLA), whereby the two L formed elements are twisted so that the whole antenna is located farther away from the user hand and head, Strikman, 1997. The DMA antenna was designed for the 1800 MHZ band where it is shown that the absorbed SAR in the head is reduced by a factor of 6–7.7 dB in comparison to a monopole antenna and $\eta_a$=72% instead of 55%. However, the hand user absorption SAR is still higher then for the monopole and at the 900 MHZ band; thus the DMA advantages are less favorable.

An IEEE transactions paper published in February 98, by the group of Professor Balanis, from Arizona University, hereby incorporated by reference, suggested a vertical folded loop wired or printed antenna with parasitic loading to enhance operation bandwidth. This antenna can operate as a dual 900 and 1800 MHZ bandwidth with less influence from the user's hand. However the absorbed head and hand SAR and the $\eta_a$ have not yet been published, Katsibas et al. 1998.

A few antenna manufacturing companies propose the use of a shielding device between the handset and the user. However, it is not very convenient and may be placed in the same category as the "hand-free" cellular system in cars, "The Use of Flexible Shielding Materials to Reduce the EM Coupling", by J. Cartrysse, URSI General Assembly Proceedings, Lille, September 1996, PPEK 3.659, hereby incorporated by reference.

WO 97/26713 to ERICSSON INC. discloses a flip cover and antenna assembly for a portable phone able to operate in both cellular mode and satellite mode. The antenna assembly thus requires two types of antennas both being enclosed in the flip cover. The cellular antenna is preferably a printed circuit antenna but may be a wire monopole type antenna as shown in FIG. 2 of the patent. In order to reduce radiation to the user the patent proposes to position the antennas near a distal end (24) of flip cover (page 6, lines 5–8) yet within the flip cover (16a in FIG. 2). Moreover, The patent specifically claims (claims 9 and 18), minimizing RF interference with the phone and any user by patterning the shape of antenna elements within the housing. Nowhere is there any hint or suggestion of using a monopole antenna that extends vertically to protrude from the cover, nor that such an antenna, within the context of the invention, would have any advantage. In this patent, the radiation problem is addressed by positioning the antenna within the cover albeit at the end thereof. The locus of radiation is still lateral to the head.

EP 661825 discloses a portable radio apparatus with an extendable monopole antenna which is independently rotated to maximize the distance between the antenna and the body of the user. This antenna, however, is positioned adjacent the microphone (FIG. 1a) or adjacent the earphone (FIG. 4a). Thus, even when the antenna is extended and rotated it cannot reach above the head. The extended antenna only increases the lateral distance between it and the head.

DE 29508792 also addresses the problem of reducing radiation to the head from mobile telephones. In this patent the antenna is also contained within the apparatus or extended from the head by means of an additional pivoting connecting element, earphone (FIG. 4a).

SUMMARY OF THE PRESENT INVENTION

The present invention seeks to provide an improved mobile telephone apparatus in which head and hand exposure to radiation is reduced.

In accordance with this invention there is provided a compact mobile telephone apparatus comprising a two part fold-over mobile phone wherein one part, the lower part, is a hand set containing a keyboard, microphone, and earphone, and the other upper part, is a cover for said handset pivotally connected thereto, characterized in that said cover contains a monopole antenna extendable through the cover, at the opposite end of the pivotal connection to the handset, to a distance of 8–16 cm. from the earphone when the cover is in the unfolded position, raising the locus of radiation laterally and vertically above the head, thereby significantly reducing radiation to the head and increasing antenna efficiency.

The antenna is preferably a $\lambda/4$ monopole antenna and is substantially retractable into the cover. A battery is generally attached to the mobile phone, preferably on the back of the handset. When the mobile phone of this invention is in the open position with the antenna extended, the angle between the handset and cover is about 180°, and the distance between the earphone and the transmission antenna is at least 8 cm. This significantly reduces the radiation and Specific Absorption Rate (SAR).

BRIEF DESCRIPTION OF THE DRAWINGS

The present invention will be understood and appreciated from the following detailed description, taken in conjunction with the following drawings, in which.

DETAILED DESCRIPTION OF THE INVENTION

Figure 1:
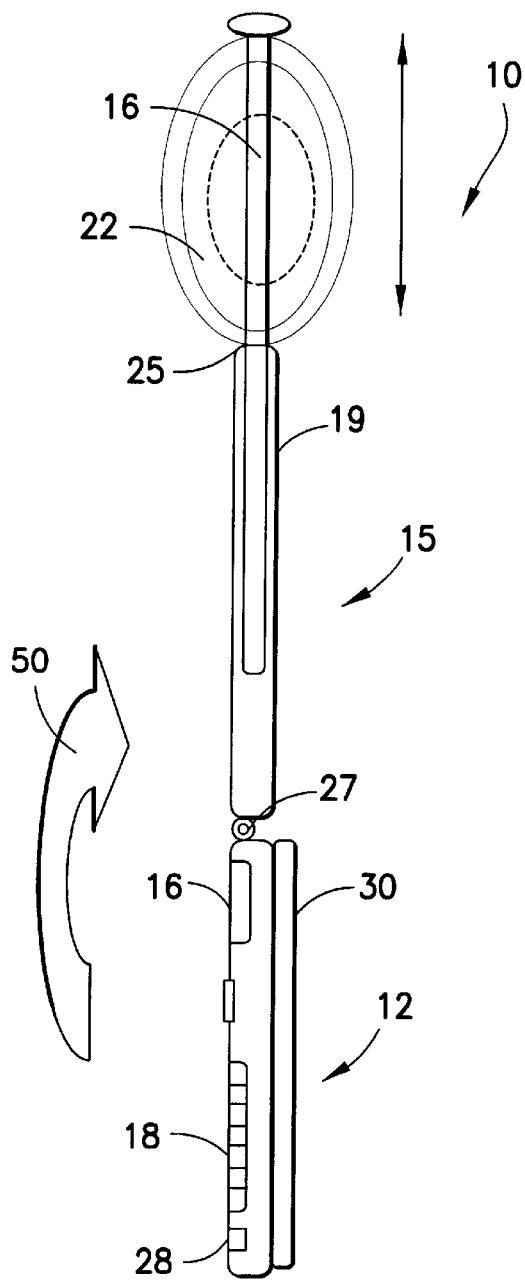
FIGS. 1 and 2 show the side and front view, respectively, of the mobile phone of the present invention.
Figure 2:
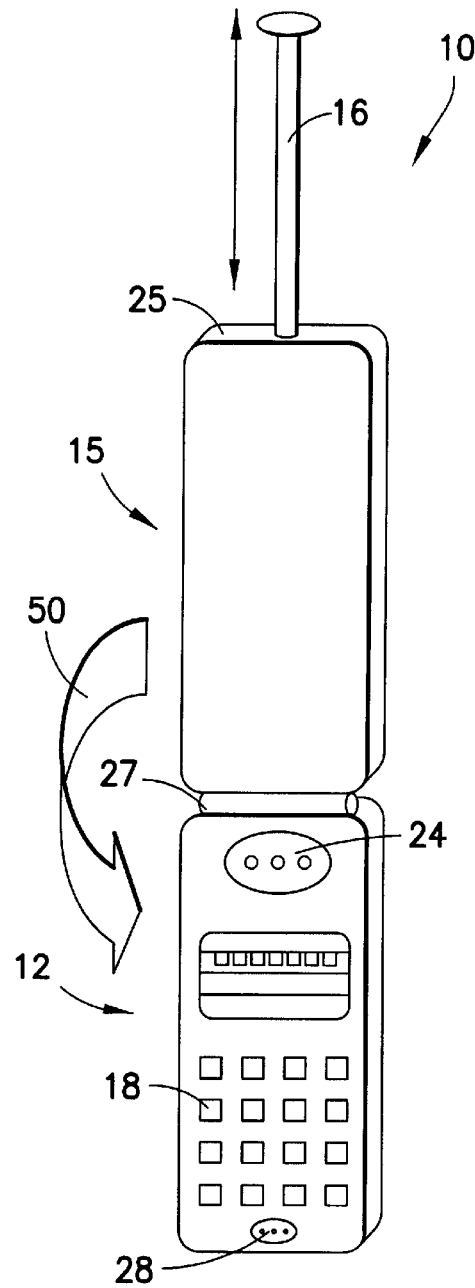
Figure 3:
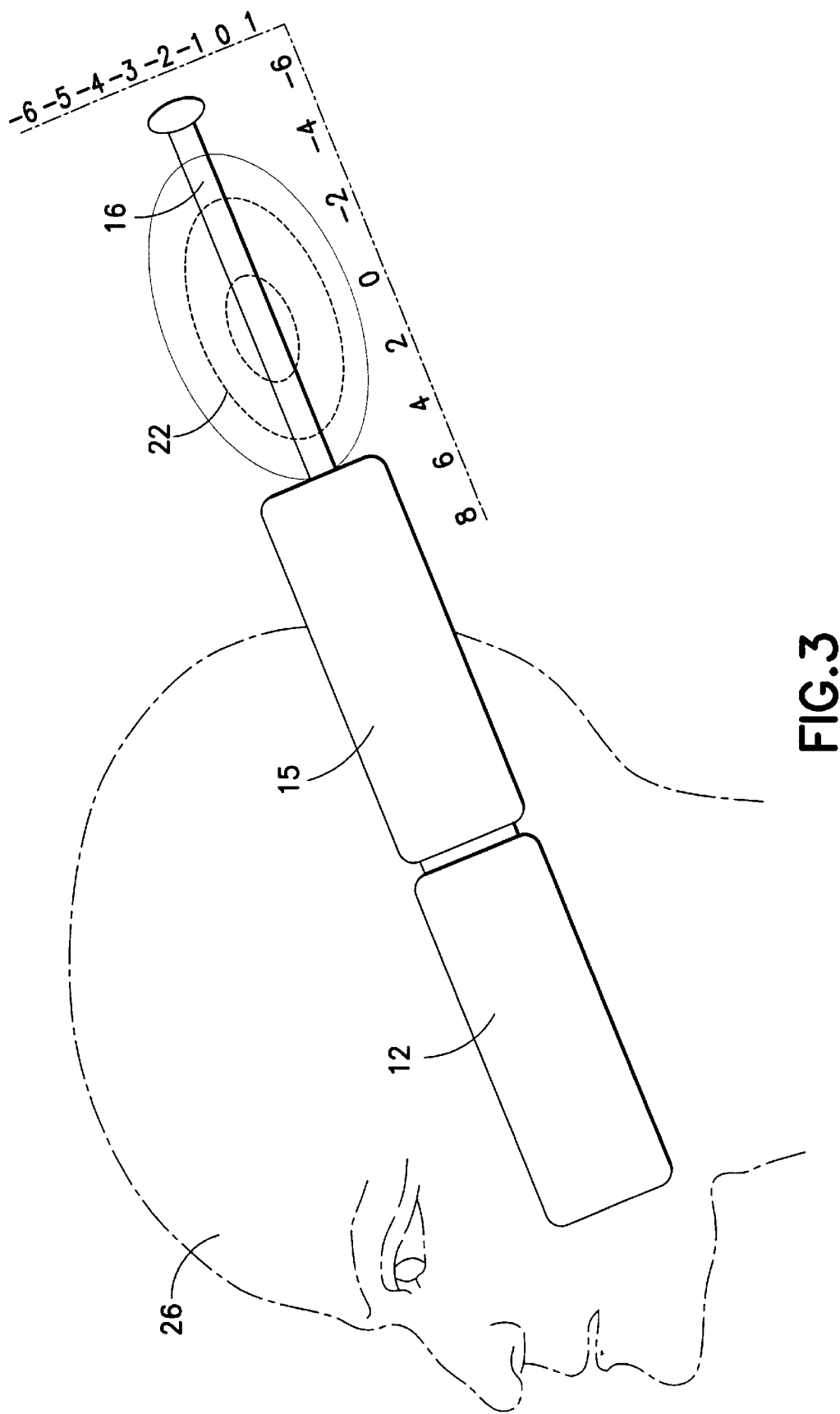
FIG. 3 shows the radiation map of the mobile phone of FIGS. 1 and 2.

In FIGS. 1–3 there is shown a mobile phone 10 which comprises a lower handset 12 and an upper fold-over cover 15 housing an antenna set 14. The handset 12 and fold over cover 15 are pivotally connected to each other so that the cover 15 containing the antenna 16 folds over the handset 12 and serves as a cover, and to place the phone in an active mode when the cover 15 is open and in an inactive mode when the cover 15 is folded over the headset 12. The antenna 16 extends out of the cover 15 at the top end 25 away from the pivotal connection 27 to the handset 12. This antenna 16 is preferably a $\lambda/4$ monopole antenna which is housed in the cover 15 consisting of a plastic case 19, and it is retractable into the interior of the cover 15 when not in use. The handset comprises a keyboard 18, an earphone 24 and a microphone 28. A battery 30 may be positioned at the back of the handset.

To operate the handset 12, the user 26 opens the mobile phone 10 by pivoting the antenna set 14 to the open position, as illustrated by arrow 50. The extended antenna 16, is distanced from the head and the body of user 26 by the combined length of the antenna 16 and the cover 15 which significantly increases the distance of the user's head 26 and hand from the radiating antenna 16. The radiation patterns 22 demonstrate the reduction in radiation reaching the user 26.

Figure 4:
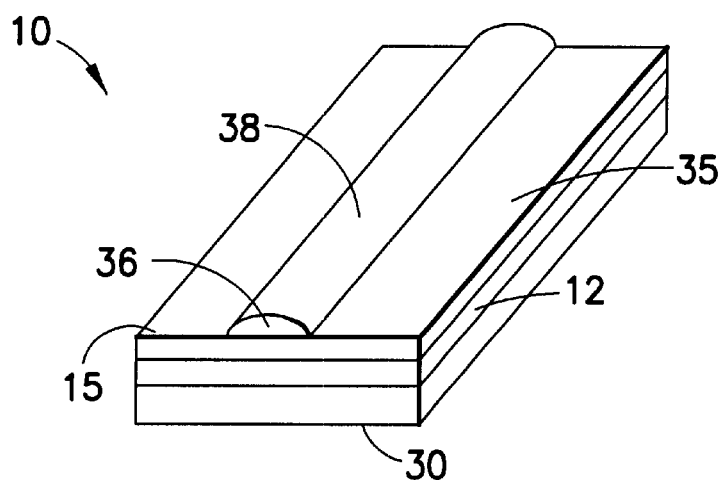
FIGS. 4 and 5 show a mobile phone similar to that in FIGS. 1 and 2, in a closed and open orientation.
Figure 5:
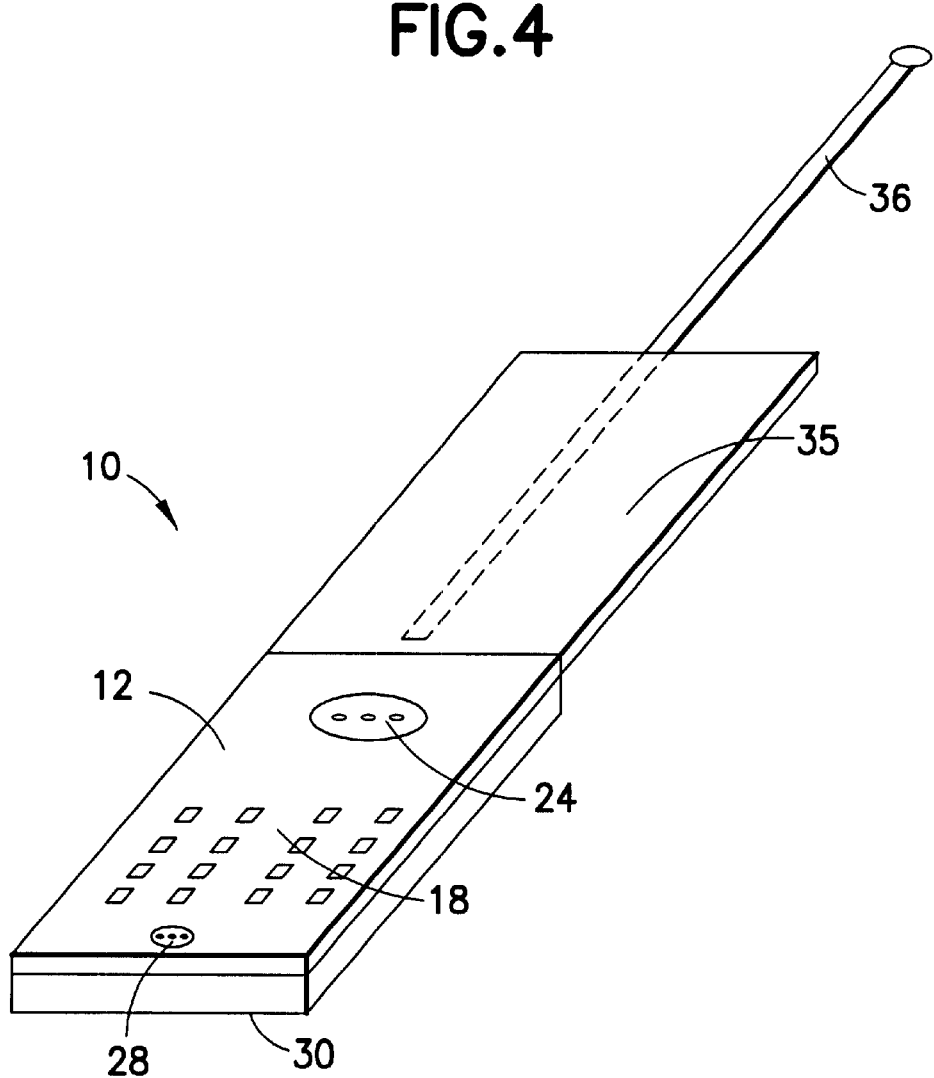

FIGS. 4 and 5 illustrate a similar mobile phone to that of FIGS. 1–2 in a closed and open orientation. In this example the extending antenna 36 is housed in a channel 38 in back of the cover 35 thus distancing the antenna 36 still further from the head and hand of the user.

The $\lambda/4$ classical monopole has an average distance, between handset and user's head, of $d_H$ of 2 cm which results in a peak SAR of 2 Watt/Kg and a low $\eta_a$ of 47% For the antenna of the present invention, the average distance, $d_H$, from the user's head is approximately 12 cm. The present invention gives a peak SAR of less than about 0.05 Watt/Kg and $\eta_a$ of 80%. Thus the reduction in radiation is about a factor of 40 (16 dB). This improvement is significant.

The results given in "Personal Communication Services, Technology and Health Concerns: Is there a common solution", Modern Radio Science 1996, pp. 263–277, show that for the $\lambda/4$ classical monopole antenna, a transmission TX power output $P_t=1$ Watt, at 900 MHz band for $d_H=1.5$ cm, the SAR is 2.6 Watt/Kg, for $d_H=2$ cm 1.7 Watt/Kg, and for $d_H=3$ cm 1.2 Watt/Kg [5]. As above, extrapolating these results to the present invention, for a typical value of $d_H=12$ cm, provides an improvement of more than 20 (13 dB).

Recent measurements, published in "Electromagnetic Radiation from Portable Radio, Wireless Cellular and Walkie-Talkie" by M. Netzer, The Israeli Electrical Engineering Bulletin, November 1996, pp. 41–46, hereby incorporated by reference, give the power density S at the user head from a Panasonic™ cordless phone for several distances, namely at $d_H=2$ cm, S=0.3 mWatt/cm^2 and for $d_H=10$ cm, S=0.015 mWatt/cm^2. The improvement achievable using an embodiment of the present is a factor of more than 30 (15 dB).

Embodiments of the present invention may thus provide a significant reduction in the EMF and SAR at the user's head, hand and body.

The invention is particularly useful when the handset has dimensions in a closed position larger than 9 cm, and the monopole radiation antenna is located above the user's head, reducing by a further factor the SAR at the user's head and additionally improving the desired signal level in the open, especially in rural areas.

Such a configuration results in a reduction in the SAR to less than 0.075 w/Kg, which is equivalent to a reduction of more then 20 )13 dB). The reduction in the SAR reaching a user's head is significant due to the antenna 16 being located at the top of the cover 15 of the mobile phone 10. The radiation efficiency towards the base station is thus also significantly improved both for reception and transmission.

It is appreciated that various features and modifications of the mobile phone of the invention are possible. Thus the StarTac type folding phone can be modified accordingly by placing the antenna as far away as possible from the earpiece when the phone is unfolded. Similarly, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A compact mobile telephone apparatus comprising a two part fold-over mobile phone, wherein:

a lower part is a hand set containing a keyboard, microphone, and earphone;

an upper part is a cover for said handset pivotally connected thereto;

said cover contains a monopole antenna extendable through the cover, at the opposite end of the pivotal connection to the handset, to a distance of 8–16 centimeters from the earphone when the cover is in the unfolded position raising the locus of radiation laterally and vertically above the head, thereby significantly reducing radiation to the head and increasing antenna efficiency.

2. A mobile telephone apparatus as in claim 1, wherein the antenna is a λ/4 monopole antenna and is substantially retractable into the cover.

3. A mobile telephone apparatus as in claim 2, wherein when the phone is in the unfolded position, the angle between the handset and cover is about 180°.

4. A mobile phone apparatus according to claim 2, wherein the radiation level in proximity to said earphone is reduced by at least ten percent.

5. A mobile phone apparatus according to claim 2, wherein the radiation level in proximity to said earphone is reduced by at least twenty percent.

6. A mobile phone apparatus according to claim 2 wherein the radiation level in proximity to said earphone is reduced by at least fifty percent.

7. A mobile phone apparatus according to claim 2, wherein the radiation level in proximity to said earpiece is reduced by at least ninety percent.

8. A mobile telephone apparatus as in claim 1, wherein a battery is attached to the mobile phone.

9. A mobile telephone apparatus as in claim 8, wherein the battery is on the back of the handset.

10. A mobile telephone apparatus as in claim 9, wherein when the phone is in the unfolded position, the angle between the handset and cover is about 180°.

11. A mobile phone apparatus according to claim 9, wherein the radiation level in proximity to said earphone is reduced by at least ten percent.

12. A mobile phone apparatus according to claim 9, wherein the radiation level in proximity to said earphone is reduced by at least twenty percent.

13. A mobile phone apparatus according to claim 9, wherein the radiation level in proximity to said earphone is reduced by at least fifty percent.

14. A mobile phone apparatus according to claim 9, wherein the radiation level in proximity to said earpiece is reduced by at least ninety percent.

15. A mobile telephone apparatus as in claim 8, wherein when the phone is in the unfolded position, the angle between the handset and cover is about 180°.

16. A mobile phone apparatus according to claim 8, wherein the radiation level in proximity to said earphone is reduced by at least ten percent.

17. A mobile phone apparatus according to claim 8, wherein the radiation level in proximity to said earphones is reduced by at least two percent.

18. A mobile phone apparatus according to claim 8, wherein the radiation level in proximity to said earphone is reduced by at least fifty percent.

19. A mobile phone apparatus according to claim 8, wherein the radiation level in proximity to said earpiece is reduced by at least ninety percent.

20. A mobile telephone apparatus as in claim 1, wherein when the phone is in the unfolded position, the angle between the handset and cover is about 180°.

21. A mobile phone apparatus according to claim 20, wherein the radiation level in proximity to said earphone is reduced by at least ten percent.

22. A mobile phone apparatus according to claim 20, wherein the radiation level in proximity to said earphone is reduced by at least twenty percent.

23. A mobile phone apparatus according to claim 20, wherein the radiation level in proximity to said earphone is reduced by at least fifty percent.

24. A mobile phone apparatus according to claim 20, wherein the radiation level in proximity to said earpiece is reduced by at least ninety percent.

25. A mobile phone apparatus according to claim 1, wherein the radiation level in proximity to said earphone is reduced by at least ten percent.

26. A mobile phone apparatus according to claim 1, wherein the radiation level in proximity to said earphone is reduced by at least twenty percent.

27. A mobile phone apparatus according to claim 1, wherein the radiation level in proximity to said earphone is reduced by at least fifty percent.

28. A mobile phone apparatus according to claim 1, wherein the radiation level in proximity to said earpiece is reduced by at least ninety percent.

* * * * *